United States Patent [19]
Yegnanarayanan et al.

[11] Patent Number: 5,794,196
[45] Date of Patent: *Aug. 11, 1998

[54] SPEECH RECOGNITION SYSTEM DISTINGUISHING DICTATION FROM COMMANDS BY ARBITRATION BETWEEN CONTINUOUS SPEECH AND ISOLATED WORD MODULES

[75] Inventors: Girija Yegnanarayanan, N. Chelmsford; John Armstrong, III, Cambridge; Dong Hsu, Arlington, all of Mass.

[73] Assignee: Kurzweil Applied Intelligence, Inc., Burlington, Mass.

[*] Notice: The term of this patent shall not extend beyond the expiration date of Pat. No. 5,677,991.

[21] Appl. No.: 669,242

[22] Filed: Jun. 24, 1996

Related U.S. Application Data

[63] Continuation-in-part of Ser. No. 496,979, Jun. 30, 1995, Pat. No. 5,677,991.

[51] Int. Cl.$^6$ .................................................. G10L 5/06
[52] U.S. Cl. ..................... 704/255; 704/239; 704/251; 704/253
[58] Field of Search ................... 395/2.48, 2.6, 395/2.62, 2.64; 704/239, 251, 253, 255

[56] References Cited

U.S. PATENT DOCUMENTS

| | | | |
|---|---|---|---|
| 4,349,700 | 9/1982 | Pirz et al. | 704/241 |
| 4,829,576 | 5/1989 | Porter | 704/235 |
| 4,980,918 | 12/1990 | Bahl et al. | 704/240 |
| 5,027,406 | 6/1991 | Roberts et al. | 704/244 |
| 5,231,670 | 7/1993 | Goldhor et al. | 704/275 |
| 5,280,563 | 1/1994 | Ganong | 704/200 |
| 5,388,183 | 2/1995 | Lynch | 704/242 |

OTHER PUBLICATIONS

Jeffrey C. Scott, "The voices of automation", Computer Shopper, vol. 16, No. 9, p. 550(6), from Computer Select, Aug. 1997.

*Primary Examiner*—David R. Hudspeth
*Assistant Examiner*—Tālivaldis Ivars Šmits
*Attorney, Agent, or Firm*—Bromberg & Sunstein LLP

[57] ABSTRACT

In the speech recognition system disclosed herein, an input utterance is submitted to both a large vocabulary isolated word speech recognition module and a small vocabulary continuous speech recognition module. The small vocabulary contains command words which can be combined in sequences to define commands to an application program. The two recognition modules generate respective scores for identified large vocabulary models and for sequences of small vocabulary models. The score provided by the continuous speech recognizer is normalized on the basis of the length of the speech input utterance and an arbitration algorithm selects among the candidates identified by the recognition modules. Without requiring the user to switch modes, text is output if a score from the isolated word recognizer is selected and a command is output if a score from the continuous speech recognizer is selected.

10 Claims, 4 Drawing Sheets

SPEECH RECOGNITION SYSTEM DISTINGUISHING DICTATION FROM COMMANDS BY ARBITRATION BETWEEN CONTINUOUS SPEECH AND ISOLATED WORD MODULES

CROSS-REFERENCE TO RELATED APPLICATION

This application is a continuation-in-part of application Ser. No. 08/496,979 filed Jun. 30, 1995 and entitled Speech Recognition System Using Arbitration Between Continuous Speech And Isolated Word Modules, now U.S. Pat. No. 5,677,991 issued on Oct. 14, 1997.

BACKGROUND OF THE INVENTION

The present invention relates to a speech recognition system and more particularly to a speech recognition system which can, without user intervention, accommodate both isolated word input from a relatively large text word vocabulary and continuous speech input from a more limited, command word vocabulary.

As is understood by those skilled in the art, large vocabulary speech recognition systems available with present technology require input utterances to be presented as isolated words or predetermined short phrases. In other words, the speaker must halt or pause between words. However, it is particularly awkward to constrain certain types of input, e.g., command phrases or sequences of numbers, to the paused sequencing necessary for isolated word speech recognition.

With presently available technology, it is, however, possible to implement continuous speech recognition if the recognition vocabulary is constrained or limited. As is understood by those skilled in the art, continuous speech recognition systems preferably employ vocabulary models and decoding procedures which are quite different from those preferably utilized for isolate word speech recognition.

It is an object of the present invention to allow a user to input spoken information in either manner without having to explicityly change mode.

BRIEF DESCRIPTION OF THE PRESENT INVENTION

The flexible speech recognition system of the present invention incorporates both an isolated word speech recognizer and a continuous speech recognizer, both of which operate on the same input utterance. The isolated word speech recognizer employs a relatively large vocabulary of respective models, i.e., the number of models exceeds 5,000, while the continuous speech recognizer employs a relatively small vocabulary of respective models, e.g., numbering less than 2000. The isolated word recognizer provides a score indicating the degree of match of the input utterance with an identified one or more of the respective models while the continuous speech recognizer provides a score indicating the degree of match of the input utterance with an identified sequence of the respective models. The score provided by the continuous speech recognizer is preferably normalized on the basis of the length of the input utterance. An arbitration algorithm then selects among the models and sequences of models identified by the recognizers. Text is output if a score from the isolated word recognizer is selected and a command is output if a score from the continuous speech recognizer is selected, without requiring the user to switch mode. Preferably, a command is checked to determine if it parses correctly before being output.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
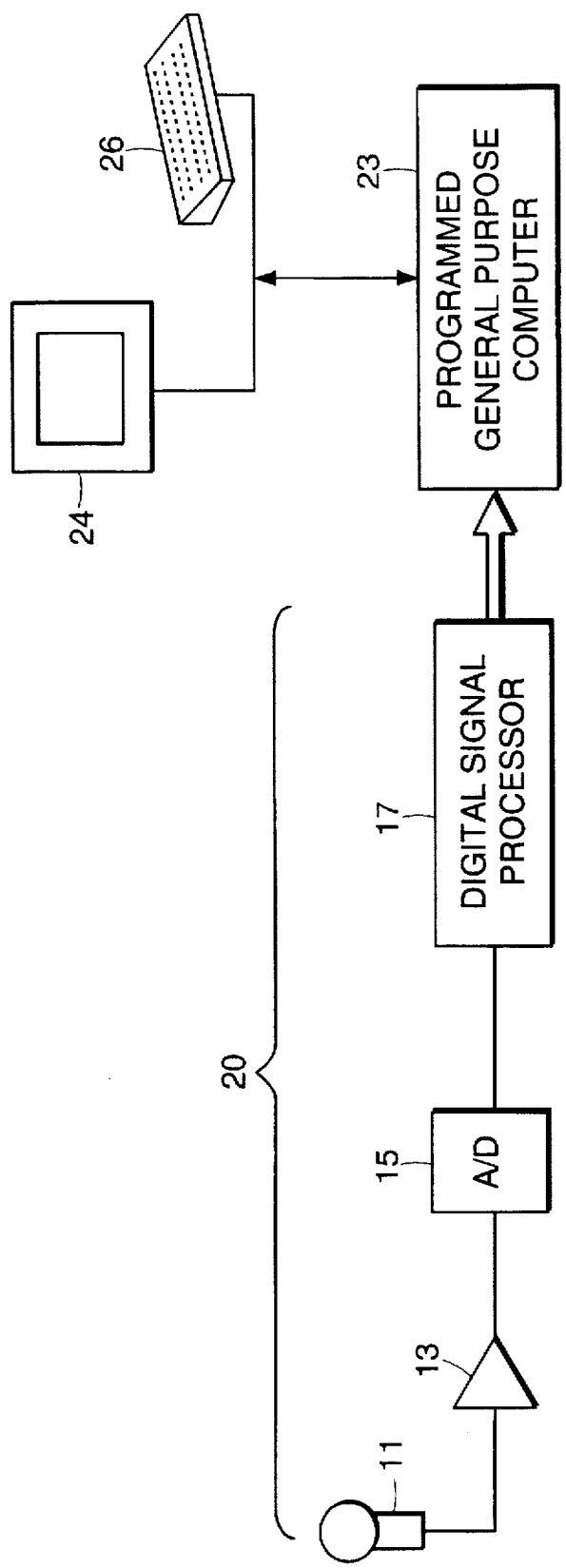
FIG. 1 is a block diagram of a speech recognition system in accordance with the present invention.

In common with many prior art systems, the preferred embodiment of the system of the present invention operates by first transducing acoustic speech waveforms to obtain corresponding electrical signals and then digitizing those signals. With reference to FIG. 1, the transducer indicated there is a microphone 11 which is connected, through a suitable preamplifier 13, to an analog-to-digital converter 15. The gain of pre-amplifier 13 is preferably adjustable under software control. As is usual in the art, the digitized speech signal is treated to obtain, at a succession of sample times, a sequence of digital values or data frames which characterize the speech. In the embodiment illustrated, these values are obtained by passing the speech signal through a digital signal processor 17 which performs a Fourier transform so as to extract spectral features characterizing the input speech. The collection of digital values defining the input spectrum at a given moment of time is referred to hereinafter as a frame. Each frame may be considered to be a multidimensional vector as understood by those skilled in the art.

Collectively, the front end circuitry is identified by reference character 20. Though the input signal processing is illustrated as being implemented digitally, it should be understood that analog filtering followed by analog-to-digital conversion might also be used. Likewise, while multichannel filtering is presently preferred, it should be understood that other methods of treating or encoding the raw input signal might also be employed, for example, linear predictive encoding which might also be done by special purpose hardware.

A general purpose microcomputer system 23, e.g., one employing an Intel Pentium microprocessor, is provided for general system management and control functions, as well as for the processing of distance or scoring calculations. As is conventional, computer 23 incorporates a video display 24 and a keyboard 26 for providing interaction with the system user.

The raw spectral information obtained from the front end circuitry 20 is further preprocessed in the computer 23 to replace each sample or input frame with an index which corresponds to or identifies one of a predetermined set of standard or prototype spectral distributions or frames. In the particular embodiment being described, 1024 such standard frames are utilized. In the art, this substitution is conventionally referred to as vector quantization and the indices are commonly referred to as VQ indices.

The preprocessing of the input data by the computer 23 also includes an estimating of the beginning and end of a word or continuous phrase in an unknown speech input segment, e.g. based on the energy level values. For this purpose, the input circuitry may incorporate a software adjustable control parameter, designated the "sensitivity" value, which sets a threshold distinguishing user speech from background noise.

Vocabulary models are represented by sequences of standard or prototype states, which are represented by indices. Rather than representing spectral distributions, the state indices identify or correspond to probability distribution functions. The state spectral index essentially serves as a pointer into a table which identifies, for each state index, the set of probabilities that each prototype frame or VQ index will be observed to correspond to that state index. The table is, in effect, a precalculated mapping between all possible frame indices and all state indices. Thus, for comparing a single frame and single state, a distance measurement or a measure of match can be obtained by directly indexing into the tables using the respective indices and combining the values obtained with appropriate weighting. It is thus possible to build a table or array storing a distance metric representing the closeness of match of each standard or prototype input frame with each standard or prototype model state.

As is understood by those skilled in the art, the distance or likelihood values which fill the tables can be generated by statistical training methods. Various such training methods are known in the art and, as they do not form a part of the present invention, they are not described in further detail herein. Rather, for the purposes of the present invention, it is merely assumed that there is some metric for determining degree of match or likelihood of correspondence between input frames and the states which are used to represent vocabulary models. A preferred system for precalculating and storing a table of distance measurements is disclosed in the copending and co-assigned application Ser. No. 08/250,699 of Thomas Lynch, Vladimir Sejnoha and Thomas Dinger, filed May 27, 1994 and entitled Speech Recognition System Utilizing Precalculated Similarity Measurements. The disclosure of that application is incorporated herein by reference.

As is understood by those skilled in the art, natural variations in speaking rate require that some method be employed for time aligning a sequence of frames representing an unknown speech segment with each sequence of states representing a vocabulary word. This process is commonly referred to as time warping.

In isolated word recognition, the sequence of frames which constitute the unknown speech segment taken together with a sequence of states representing a vocabulary model in effect define a matrix and the time warping process involves finding a path across the matrix which produces the best score, e.g., least distance or cost. The distance or cost is typically arrived at by accumulating the cost or distance values associated with each pairing of frame index with state index as described previously with respect to the VQ (vector quantization) process. An isolated word speech recognition system will typically identify the best scoring model and may also identify a ranked list of possible alternates.

In addition to words which are to be recognized so as to generate an appropriate translation (spelling) as text input for a user's application program, the discrete word vocabulary may also include models of common intrusive noises, e.g. paper rustling, door closing, or a cough. When an acoustic input is best matched with one of these models, a NUL output or no output is provided to the user's application program.

In continuous speech recognition, states corresponding to phones or other sub-units of speech are typically interconnected in a form of network which is decoded in correspondence with the ongoing utterance. A score is then built up progressively as the utterance proceeds. The total score this is a function both of the degree of match of the utterance with the decoded path and the length of the utterance.

Figure 2:
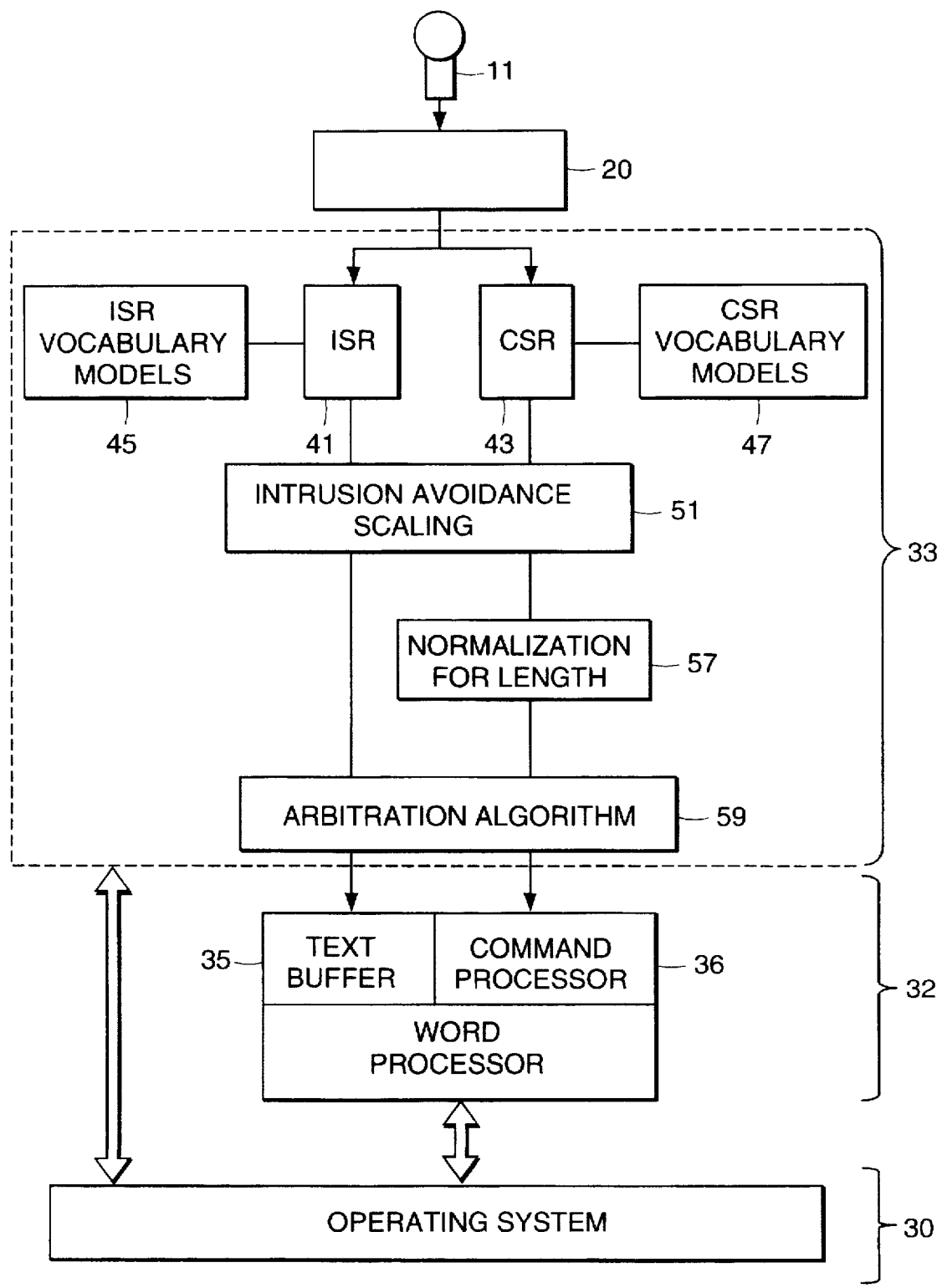
FIG. 2 is a diagram illustrating the relationship of various software components employed in the system of FIG. 1.

Referring now to FIG. 2, the software components illustrated there can be grouped into three subsystems, the operating system 30, an application program such as a word processor 32, and the compound speech recognizer 33 of the present invention. The operating system may, for example, be the Windows 95 operating system from Microsoft of Belleview, Wash. while the application program, for example, could be the Wordperfect word processing software from WordPerfect Corporation of Orem, Utah. As is understood, application programs such as word processors and spreadsheets expect that command input should be differentiated from text or data input. Further, commands are typically made up of a sequence of words. While discrete word recognizers can recognize simple or short phrase commands which match up with a single predetermined model, e.g. in the manner described in U.S. Pat. No. 5,231,670 (Goldhor), the flexibility of such systems is limited. In FIG. 2, the word processor's text buffer is indicated by reference character 35 while the command processor component is indicated by reference character 36.

The compound speech recognizer 33 illustrated in FIG. 2 includes both an isolated-word speech recognition (ISR) module 41 and a continuous speech recognition (CSR) module 43. An input utterance received by the microphone 11 and processed by the front end 20 is applied to both the ISR module 41 and the CSR module 33. While these modules are shown in FIG. 2 as though operating on the input in parallel, it will be understood by those skilled in the computer art that these operations may in fact occur sequentially or may, in fact, be performed on a time shared basis using the computational resources available. As noted previously, the continuous speech recognizer typically works by building up a hypothesis progressively and, thus, it can start working while the utterance is taking place. The isolated word speech recognizer on the other hand typically requires a complete set of input frames before it performs its comparison process.

The ISR module 41 employs a large vocabulary of appropriately defined text word models, this vocabulary being designated by reference character 45. In the context of the present invention, a large vocabulary may be considered as one having in excess of 5000 models and typically in the order of 30,000 models. In contrast, the CSR module 43 employs a relatively small vocabulary of appropriately configured control word models, designated by reference character 47. In the context of the present invention, a small vocabulary may be considered to be one of fewer than 2000 models and typically in the order of 200 models. Some words may appear in both vocabularies but, as indicated previously, they will be differently represented and incorrect interpretations should be logically excluded.

As indicated previously, the two recognition modules 41 and 43 will employ different types of models and different scoring mechanisms so that the scores are not directly comparable. Relative scaling of the scores is applied as indicated at reference character 51 to minimize or avoid intrusions by each vocabulary on correct translations from the other vocabulary. As will be apparent, a single scale factor could be applied to the results of either of the recognizer modules or respective factors could be applied to both. In the particular embodiment illustrated, a scaling factor is applied to the scores obtained from the CSR module 43 to render them basically comparable with the scores obtained from the ISR module 41. A procedure for training up this scaling factor is described in greater detail hereinafter with reference to FIG. 3.

Since the total score generated by the CSR will be affected by the length of the utterance (which may comprise multiple control words, digits or other vocabulary models), a normalization for length is applied as indicated at reference character 57. This normalization can also be incorporated within the arbitration algorithm as next described.

An arbitration algorithm for selecting among the competing translation candidates is indicated at reference character 59. The operation of this algorithm is described in greater detail hereinafter with reference to FIG. 4.

Figure 3:
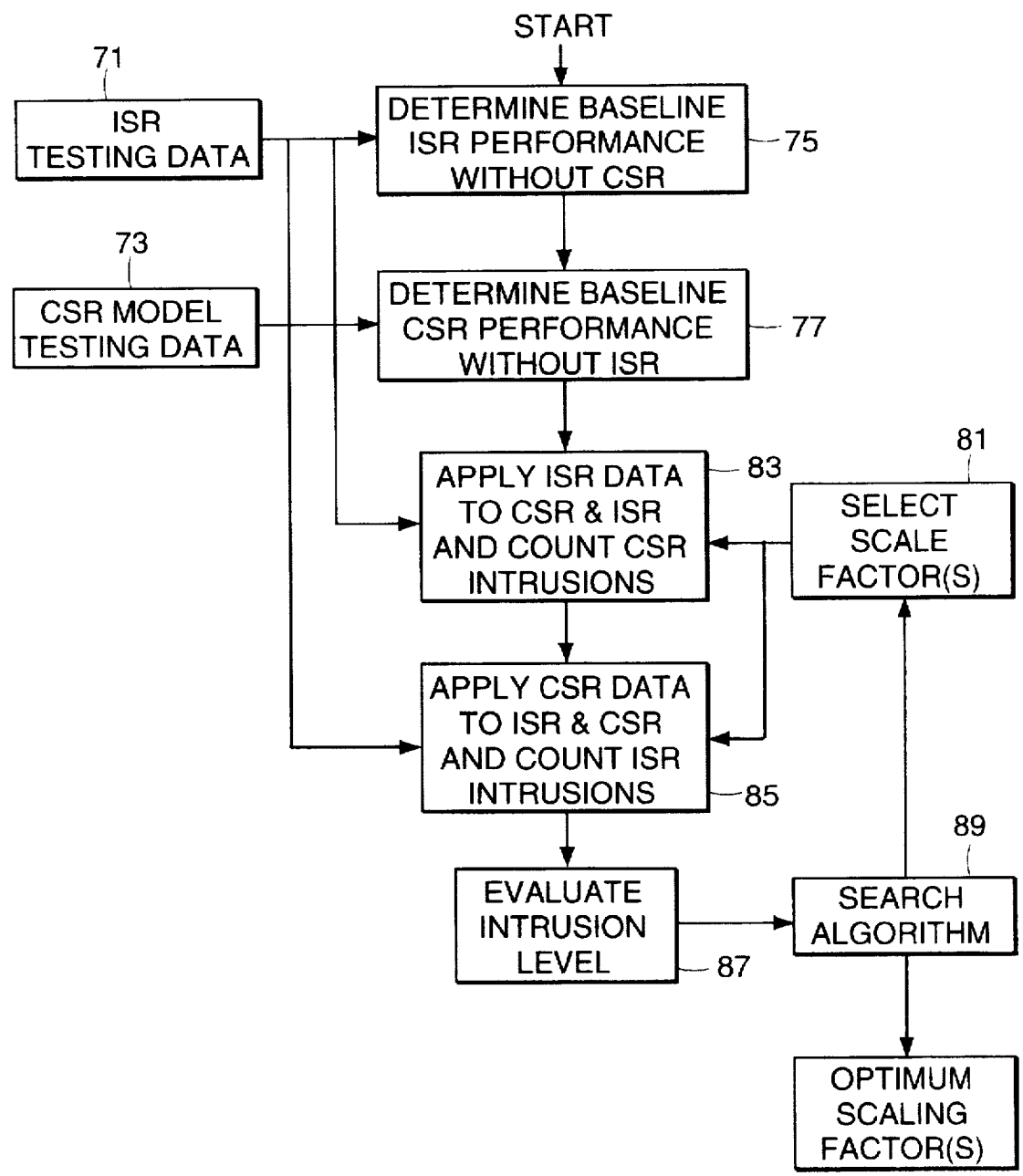
FIG. 3 is a flow chart illustrating the training of scaling values utilized in the system of FIGS. 1 and 2.

As indicated previously, the ISR module and the CSR module employ models of different character. Further, each of these sets of models will typically have been trained using a respective source of training data, i.e., multiple samples of various users speaking the words to be recognized. Likewise, each set of models will typically be tested with a separate respective set of data. In FIG. 3, the ISR model testing data is indicated by reference character 71 and the CSR model testing data is indicated by reference character 73.

Baseline performance levels for the ISR and CSR modules is first determined independently for each module without interference by the other as indicated respectively at reference characters 75 and 77. For a given scale factor selected as indicated at reference character 79, the ISR testing data is then applied both to the CSR and the ISR modules, as indicated at reference character 83, and the intrusions by CSR models are counted. An intrusion is a case in which a CSR hypothesis has produced a score better than the score accorded to the correct translation by the ISR module. Similarly, the CSR testing data is applied to the ISR and CSR modules as indicated at reference character 85 and intrusions by ISR translations into correct CSR translations are counted.

The intrusion level is evaluated as indicated at reference character 87 and a search algorithm, designated by reference character 89, repeatedly adjusts the selected scale factor to minimize the intrusion level and to identify the optimum scaling factor which is then output and utilized in the step indicated by reference character 51 in FIG. 2. Any one of various search algorithms may be utilized, the simplest of which is to merely generate a series of scale factors and then pick the best performing one of them.

Figure 4:
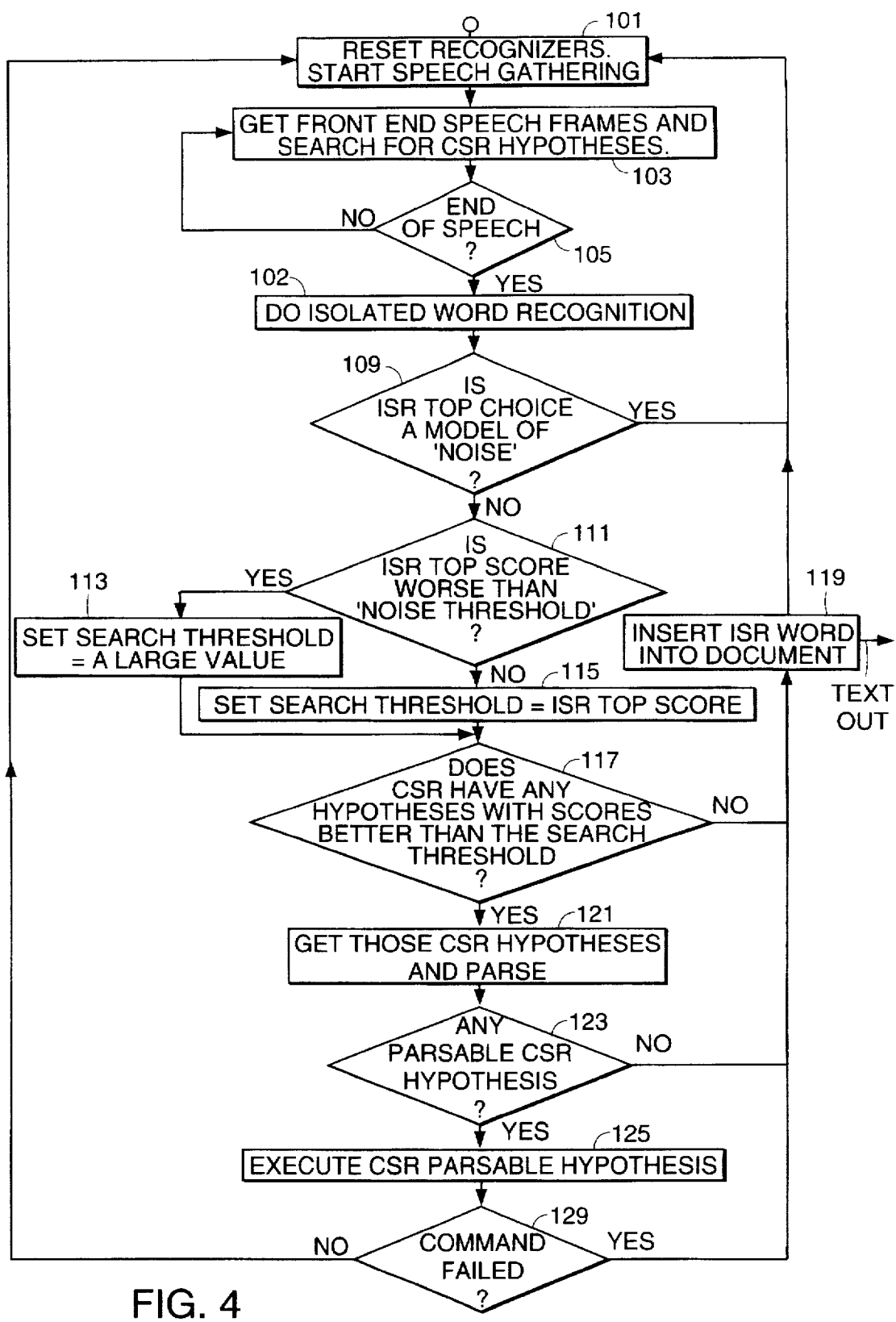
FIG. 4 is a flow chart illustrating the operation of the compound speech recognizer included in the system of FIG. 2.

As indicated previously, the general operation of the arbitration algorithm 59 is to determine whether the user's utterance corresponds best with text input or command input and to select the appropriate or corresponding translation for outputting to the corresponding portion of the application program. With reference to FIG. 4, the procedure starts with both recognizers being reset and an utterance beginning so that the front end is generating a sequence of frames as described previously. This initial stage is indicated by reference character 101.

As indicated previously, the continuous speech recognizer works progressively and thus can start developing hypotheses immediately. This operation is designated at reference character 103. As also indicated previously, the front end processing also determines the start and end of speech. Testing for the end of speech is indicated at reference character 105. So long as the end of speech is not detected, the CSR operation continues.

Once the end of speech is detected, isolated word recognition is performed as indicated at block 107. If the top choice out of the isolated word recognizer is a model which is associated with a predetermined noise, the system resets as indicated at block 109. A test is also performed, as indicated at block 111, to determine if the score of the best scoring model was better than an arbitrarily selected noise threshold. If there is a poor score, the CSR search threshold is set to a preselected large value as indicated at block 113. Otherwise, the CSR search threshold is set equal to the best score generated by the isolated word recognizer, this step being indicated at block 115.

If the CSR does not have any hypotheses with scores better than the search threshold, as tested at block 117, the word corresponding to the best scoring model recognized by the isolated word recognizer is output to the text buffer of the word processor, as indicated at block 119, and the compound recognizer is reset by returning to block 101.

In the preferred embodiment illustrated, examples of properly parsable commands are as follows:

erase the previous word
align line to the left
center sentence
underline this
delete previous word
open file
capitalize this line
bold the first four words in the next paragraph
uppercase the next four words
move this paragraph to the end of the document
italicize the last three words in this sentence
bold this sentence
decrease font size of this line by two
bullet the next four paragraphs
go to the beginning of the previous paragraph
extend the selection by five more characters
delete this sentence If the CSR has hypotheses with scores better than the search threshold, those hypotheses are parsed, as indicated at block 121 to determine if the sequence of models equates with a reasonable command string. If none of the qualifying CSR hypotheses are parsable, as tested at block 123, the best scoring text word from the isolated word recognizer is output (119) and the compound recognizer again reset as indicated at block 101.

If any of the CSR qualifying hypotheses are parsable, the best scoring one is submitted to the command processor 36 of the application program as indicated at block 125. Even though a command string is properly parsable, it may not be executable by the application program if the current state of the application program does not admit of such command. In such a case, the application program will typically return an error code indicating that the command failed. If the command fails, as tested at block 129, the compound recognizer reverts to outputting the text word identified by the isolated word recognizer and resets. On the other hand, if the command succeeds, the process reverts to the starting point where the recognizers are reset as indicated at block 101.

From the foregoing, it can be seen that, with the scaling factor adjusted as described, a user can dictate, in an isolated or paused manner, text chosen from the large isolated word vocabulary 45 or, without changing modes or otherwise intervening in the ongoing operation of the system, can speak continuous speech commands selected from the smaller vocabulary 47 available to the continuous speech recognition module 43.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A speech recognition system which separately outputs text and commands comprising:

an isolated word speech recognizer;

accessible by said isolated word speech recognizer, a first vocabulary of respective text word models, said isolated word speech recognizer operating to compare speech input with at least a selected portion of said first vocabulary and to provide a plurality of scores indicating the degree of match of said speech input with an identified one or more of said models;

a continuous speech recognizer;

accessible by said continuous speech recognizer, a second vocabulary of respective command word models, said continuous speech recognizer operating to compare speech input to said second vocabulary of command word models and to provide a score indicating the degree of match of said speech input with at least one identified sequence of the respective models;

an arbitration algorithm for selecting from among the models identified by said isolated word speech recognizer and the sequence of models identified by said continuous speech recognizer and for outputting corresponding text if a score from said isolated word recognizer is selected and outputting a respective command if a score from said continuous speech recognizer is selected.

2. A recognition system as set forth in claim 1 further comprising means for applying a relative scaling to said recognizer scores by a factor empirically trained to minimize incursions by each of said vocabularies on correct results from the other vocabulary.

3. A recognition system as set forth in claim 2 wherein said scaling factor is determined by applying, with a given factor, A. isolated word test data to both recognizers and counting the intrusions by CSR models on correct ISR translations, and B. continuous word test data to both recognizers and counting intrusions by ISR models on correct CSR translations, and then adjusting said factor to minimize intrusions.

4. A recognition system as set forth in claim 1 further comprising means for testing a sequence of models scored by said continuous speech recognizer to determine if the sequence parses into an executable command.

5. A recognition system as set forth in said claim 1 wherein said text word vocabulary includes in excess of 5000 models and said command word vocabulary includes fewer than 2000 models.

6. A recognition system as set forth in claim 1 further comprising means for normalizing the score provided by said continuous speech recognizer on the basis of the length of the speech input.

7. A speech recognition system which separately outputs text and commands comprising:

an isolated word speech recognizer;

accessible by said isolated word speech recognizer, a first vocabulary of respective text word models numbering in excess of 5000, said isolated word speech recognizer operating to compare speech input with at least a selected portion of said first vocabulary and to provide a plurality of scores indicating the degree of match of said speech input with identified ones of said models;

a continuous speech recognizer;

accessible by said continuous speech recognizer, a second vocabulary of respective command word models numbering less than 2000, said continuous speech recognizer operating to compare speech input to said second vocabulary of models and to provide a score indicating the degree of match of said speech input with an identified sequence of the respective models;

means for normalizing the score provided by said continuous speech recognizer on the basis of the length of the speech input;

an arbitration algorithm for selecting from among the models identified by said isolated word speech recognizer and the sequence of models identified by said continuous speech recognizer and for outputting corresponding text if a score from said isolated word recognizer is selected and outputting a respective command if a score from said continuous speech recognizer is selected.

8. A recognition system as set forth in claim 7 further comprising means for applying a relative scaling to said recognizer scores by a factor empirically trained to minimize incursions by each of said vocabularies on correct results from the other vocabulary.

9. A speech recognition system which separately outputs text and commands comprising:

an isolated word speech recognizer;

accessible by said isolated word speech recognizer, a vocabulary of respective text word models numbering in excess of 5000, said isolated word speech recognizer operating to compare speech input with at least a selected portion of said first vocabulary and to provide a plurality of scores indicating the degree of match of said speech input with identified ones of said models;

a continuous speech recognizer;

accessible by said continuous speech recognizer, a second vocabulary of respective command word models numbering less than 2000, said continuous speech recognizer operating to compare speech input to said second vocabulary of models and to provide a score indicating the degree of match of said speech input with an identified sequence of the respective models;

means for normalizing the score provided by said continuous speech recognizer on the basis of the length of the speech input;

means for applying a relative scaling to said recognizer scores by a factor empirically trained to minimize incursions by each of said vocabularies on correct results from the other vocabulary; and an arbitration algorithm for selecting from among the models identified by said isolated word speech recognizer and the sequence of models identified by said continuous speech recognizer and for outputting corresponding text if a score from said isolated word recognizer is selected and outputting a respective command if a score from said continuous speech recognizer is selected.

10. A recognition system as set forth in claim 9 wherein said scaling factor is determined by applying, with a given factor, A. isolated word test data to both recognizers and counting the intrusions by CSR models on correct ISR translations, and B. continuous word test data to both recognizers and counting intrusions by ISR models on correct CSR translations, and then adjusting said factor to minimize intrusions.

* * * * *

UNITED STATES PATENT AND TRADEMARK OFFICE
CERTIFICATE OF CORRECTION

PATENT NO. : 5,794,196
DATED : August 11, 1998
INVENTOR(S) : Yegnanarayanan et al.

It is certified that error appears in the above-identified patent and that said Letters Patent is hereby corrected as shown below:

Column 7, line 49, delete "said"

Signed and Sealed this

Sixteenth Day of February, 1999

Attest:

Attesting Officer

*Acting Commissioner of Patents and Trademarks*